(12) United States Patent
Johnson

(10) Patent No.: US 7,131,001 B1
(45) Date of Patent: Oct. 31, 2006

(54) APPARATUS AND METHOD FOR SECURE FILED UPGRADABILITY WITH HARD WIRED PUBLIC KEY

(75) Inventor: Anders Johnson, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 843 days.

(21) Appl. No.: 09/685,192

(22) Filed: Oct. 11, 2000

Related U.S. Application Data

(60) Provisional application No. 60/162,209, filed on Oct. 29, 1999, provisional application No. 60/162,157, filed on Oct. 29, 1999, provisional application No. 60/193,378, filed on Mar. 31, 2000.

(51) Int. Cl.
*H04K 1/00* (2006.01)
(52) U.S. Cl. ............ 713/168; 713/181; 713/189; 713/193; 280/277
(58) Field of Classification Search ........ 380/228–229, 380/241, 255, 257, 264, 269, 277–279, 282, 380/286, 28–30, 285; 713/170–171, 182, 713/185, 200–202, 150, 161, 167–168; 711/163–164, 711/216; 705/56, 78, 216, 219; 709/216, 709/219; 726/1–7, 21, 17–19, 26, 27–30
See application file for complete search history.

(56) References Cited

U.S. PATENT DOCUMENTS

| | | | |
|---|---|---|---|
| 5,278,789 A | 1/1994 | Inoue et al. .......... 365/189.01 |
| 5,390,173 A | 2/1995 | Spinney et al. ............. 370/393 |
| 5,414,704 A | 5/1995 | Spinney ..................... 370/389 |
| 5,423,015 A | 6/1995 | Chung ....................... 711/108 |
| 5,459,717 A | 10/1995 | Mullan et al. .............. 370/351 |
| 5,473,607 A | 12/1995 | Hausman et al. ........... 370/392 |
| 5,499,295 A | 3/1996 | Cooper ....................... 380/270 |
| 5,524,254 A | 6/1996 | Morgan et al. ............. 709/245 |
| 5,555,398 A | 9/1996 | Raman ....................... 711/143 |
| 5,568,477 A | 10/1996 | Galand et al. .............. 370/229 |
| 5,579,301 A | 11/1996 | Ganson et al. .............. 370/229 |
| 5,644,784 A | 7/1997 | Peek .......................... 710/24 |
| 5,652,579 A | 7/1997 | Yamada et al. ............... 341/23 |

(Continued)

FOREIGN PATENT DOCUMENTS

EP 0312917 A2 4/1989

(Continued)

OTHER PUBLICATIONS

Microsoft Computer Dictionary, 2002, Microsoft Press, 5th Edition, pp. 232 & 381.*

(Continued)

*Primary Examiner*—Hosuk Song
*Assistant Examiner*—Leynna T. Ha
(74) *Attorney, Agent, or Firm*—Squire, Sanders & Dempsey LLP

(57) ABSTRACT

An apparatus and for enabling functionality of a component, wherein the apparatus includes an identification module having an identification number stored therein, and a hash function module in communication with the identification module. A host is provided and is in communication with the identification module, and a guess register in communication with the host is provided. An encryption module is provided and is in communication with the guess register, and a public key module in communication with the encryption module is provided, wherein the public key module has a public key stored therein. A comparator in communication with the encryption module and the hash function module is provided, such that the comparator may compare a first bit string to a second bit string to generate a function enable output for the component.

19 Claims, 4 Drawing Sheets

U.S. PATENT DOCUMENTS

| | | | | |
|---|---|---|---|---|
| 5,694,471 | A * | 12/1997 | Chen et al. | 705/76 |
| 5,696,899 | A | 12/1997 | Kalwitz | 709/228 |
| 5,742,613 | A | 4/1998 | MacDonald | 714/711 |
| 5,748,631 | A | 5/1998 | Bergantino et al. | 370/398 |
| 5,781,549 | A | 7/1998 | Dai | 370/398 |
| 5,787,084 | A | 7/1998 | Hoang et al. | 370/390 |
| 5,790,539 | A | 8/1998 | Chao et al. | 370/390 |
| 5,802,052 | A | 9/1998 | Venkataraman | 370/395.72 |
| 5,802,287 | A | 9/1998 | Rostoker et al. | 370/395.5 |
| 5,825,772 | A | 10/1998 | Dobbins et al. | 370/396 |
| 5,828,653 | A | 10/1998 | Goss | 370/230 |
| 5,831,980 | A | 11/1998 | Varma et al. | 370/395.72 |
| 5,832,090 | A * | 11/1998 | Raspotnik | 705/66 |
| 5,842,038 | A | 11/1998 | Williams et al. | 710/5 |
| 5,845,081 | A | 12/1998 | Rangarajan et al. | 709/224 |
| 5,875,312 | A * | 2/1999 | Walsh et al. | 710/303 |
| 5,887,187 | A | 3/1999 | Rostoker et al. | 712/29 |
| 5,892,922 | A | 4/1999 | Lorenz | 709/238 |
| 5,898,687 | A | 4/1999 | Harriman et al. | 370/390 |
| 5,909,686 | A | 6/1999 | Muller et al. | 707/104.1 |
| 5,918,074 | A | 6/1999 | Wright et al. | 710/52 |
| 5,940,596 | A | 8/1999 | Rajan et al. | 709/242 |
| 5,987,507 | A | 11/1999 | Creedon et al. | 709/215 |
| 6,011,795 | A | 1/2000 | Varghese et al. | 370/392 |
| 6,018,425 | A * | 1/2000 | Nakabayashi et al. | 359/753 |
| 6,041,053 | A | 3/2000 | Douceur et al. | 370/389 |
| 6,061,351 | A | 5/2000 | Erimli et al. | 370/390 |
| 6,084,969 | A * | 7/2000 | Wright et al. | 380/271 |
| 6,119,196 | A | 9/2000 | Muller et al. | 710/243 |
| 6,119,229 | A * | 9/2000 | Martinez et al. | 726/28 |
| 6,175,902 | B1 | 1/2001 | Runaldue et al. | 711/159 |
| 6,185,185 | B1 | 2/2001 | Bass et al. | 370/230 |
| 6,338,140 | B1 * | 1/2002 | Owens et al. | 713/168 |
| 6,353,433 | B1 * | 3/2002 | Schumer | 345/173 |
| 6,370,649 | B1 * | 4/2002 | Angelo et al. | 713/202 |
| 6,457,126 | B1 * | 9/2002 | Nakamura et al. | 713/166 |
| 6,463,537 | B1 * | 10/2002 | Tello | 713/182 |
| 6,480,097 | B1 * | 11/2002 | Zinsky et al. | 340/5.8 |
| 6,577,858 | B1 * | 6/2003 | Gell | 455/407 |
| 6,735,694 | B1 * | 5/2004 | Berstis et al. | 713/178 |
| 6,745,331 | B1 * | 6/2004 | Silverbrook | 713/200 |
| 6,985,452 | B1 * | 1/2006 | Marshall et al. | 370/310 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"A High-Speed CMOS Circuit for 1.2-Gb/s 16×16 ATM Switching," Alain Chemarin et al. 8107 IEEE Journal of Solid-State Circuits 27(1992) Jul., No. 7, New York, US, pp. 1116-1120.

"Local Area Network Switch Frame Lookup Technique for Increased Speed and Flexibility," 700 IBM Technical Disclosure Bulletin 38(1995) Jul., No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Cicuits 28(1993) Jul., No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

APPARATUS AND METHOD FOR SECURE FILED UPGRADABILITY WITH HARD WIRED PUBLIC KEY

REFERENCE TO RELATED APPLICATIONS

This application claims priority of U.S. Provisional Patent Application Ser. No. 60/162,209 filed on Oct. 29, 1999, U.S. Provisional Patent Application Ser. No. 60/162,157 filed on Oct. 29, 1999, and U.S. Provisional Patent Application Ser. No. 60/193,378 filed on Mar. 31, 2000. The contents of these earlier filed applications are hereby incorporated by reference.

BACKGROUND OF THE INVENTION

1. Field of the Invention

The invention relates to a method and apparatus for selectively and securely enabling additional functionality of an electronic component not expressly enabled at the manufacturing or design stages based upon cryptography principles.

2. Description of the Related Art

Cryptography is generally defined as the technology of encoding information so that the information itself, upon storage and/or transmission, can only be accessed by individuals authorized to utilize the information. Cryptography has wide ranging application in various fields and implementations. For example, cryptography can be used to encrypt a sensitive data file, such as a business plan, so that other parties, such as competitors, even if they gain access to the physical location of the data, cannot take advantage of the content of the data. Additionally, cryptography is regularly used to send and receive secure messages between users via e-mail, radio transmission, and satellite communications, along with many other data transmission links. In implementing these types of cryptographic systems, various "types" of cryptography are used. For example, private key cryptography is a type of cryptography where the sender and receiver both have the same key or similar keys, which are used to decode the encrypted message/data. Alternatively, public key cryptography is a form of cryptography in which each user has a public key and a private key, and therefore, messages are sent encrypted with the receiver's public key and the receiver decrypts the messages through use of the private key. Using the public key method, the private key is generally not revealed to anyone other than the intended users and/or recipients of the information. Another form of cryptography is symmetric key cryptography, which is often used in computer transmission related situations, wherein both ends have the same encryption key, which is used for encryption and decryption.

Furthermore, although general cryptography has been a practiced art for nearly 100 years, recent advances in computer related technologies have opened a whole new realm of applications for cryptography. For example, given current computer technology, cryptographic methods are often implemented in various software applications in order to enable and/or disable access to selected software and/or hardware functions. However, software driven cryptographic functions have an inherent degree of vulnerability as a result of their code driven nature.

One particular area where cryptographic methods have been recently used is in the computer hardware enablement field. Although previous implementations such as physical jumpers and secret registers are effective from a physical point of view, these methods are unsecured, and therefore, impractical for most computer applications, as they can easily be bypassed by a clever user. An example of the use of these types of methods is when manufacturers of electronic/computer components manufacture components having various ranges of capabilities and options, as evidenced by the different models of the product. However, in view of the cost associated with producing multiple variations/models of a product in order to create the range of capabilities desired by consumers, manufacturers often produce a single product capable of executing all of the desired functions of the entire product line. This product is then sold as the "top of the line" model. Then, in order to generate the "lower" models, the top of the line model is simply sold with one or more of the features disabled. Therefore, through this technique, manufacturers are generally able to manufacture a single product line having a single design and manufacturing cost, wherein the single product is capable of supporting numerous product models in a product line.

This process has a second advantage, as the manufacturer is then able to offer consumers the option of upgrading their product, without having to physically exchange the hardware for an upgraded model. Rather, the manufacturers can simply enable the desired functions of the hardware in order to upgrade the product. However, this advantage comes with an inherent disadvantage, as a consumer who knows that the product purchased includes disabled upgrades may attempt to enable the additional functionality of the product without the manufacturer's permission, which eliminates or at least reduces the possibility of the manufacturer obtaining compensation for the upgraded product. This situation has been attempted to be addressed through previous functionality enablement methods (jumpers and private registers), however, the vulnerability of these methods has been shown to be nearly ineffective against a reasonably sophisticated attacker.

Therefore, in view of the vulnerability of previous enablement methods in conjunction with the desired manufacturing methods for electronic/computer related products, it is an object of the present invention to implement a cryptographic method wherein the secure portions of the method, e.g. the relevant keys, are implemented in electronic/computer products. Secure, for purposes of cryptographic enablement, is generally defined as the point where the cost of obtaining unauthorized access to a component exceeds the cost associated with obtaining authorized access. More particularly, it is an object of the present invention to implement cryptographic functions for enabling functionality of electronic/computer related components, wherein the relevant secure key related information is contained within computer hardware in a non-volatile memory device and not within a purely software driven configuration. Further still, it is an object of the present invention to provide the ability to conduct secure functionality enablement on electronic/computer related components, wherein a public key for enabling the component is contained onboard and utilized in conjunction with a randomly generated component identifier in order to selectively enable additional functionality of the component.

SUMMARY OF THE INVENTION

The present invention provides an apparatus for enabling functionality of a component, wherein the apparatus includes an identification module having an identification number stored therein, and a hash function module in communication with the identification module. A host is provided and is in communication with the identification module, and a guess register in communication with the host is provided. An encryption module is provided and is in communication with the guess register, and a public key module in communication with the encryption module is provided, wherein the public key module has a public key stored therein. A comparator in communication with the encryption module and the hash function module is provided, such that the comparator may compare a first bit string to a second bit string to generate a function enable output for the component.

The present invention further provides a component for selectively enabling functionality of an electronic device, wherein the component includes a means for generating an encrypted bit string, a means for acquiring a guess passcode, and a hash function module in communication with an on board memory, wherein the on board memory has a pre-defined identification number stored therein. A means for determining if the encrypted bit string matches the guess passcode is provided, and a means for outputting a functionality enable signal is included.

The present invention further provides a method for enabling functionality of an electronic component, wherein the method includes the steps of encrypting a first bit string and a second bit string to generate a third bit string, calculating a fourth bit string, comparing the fourth bit string to the third bit string, and generating a function enable signal in accordance with the comparison.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
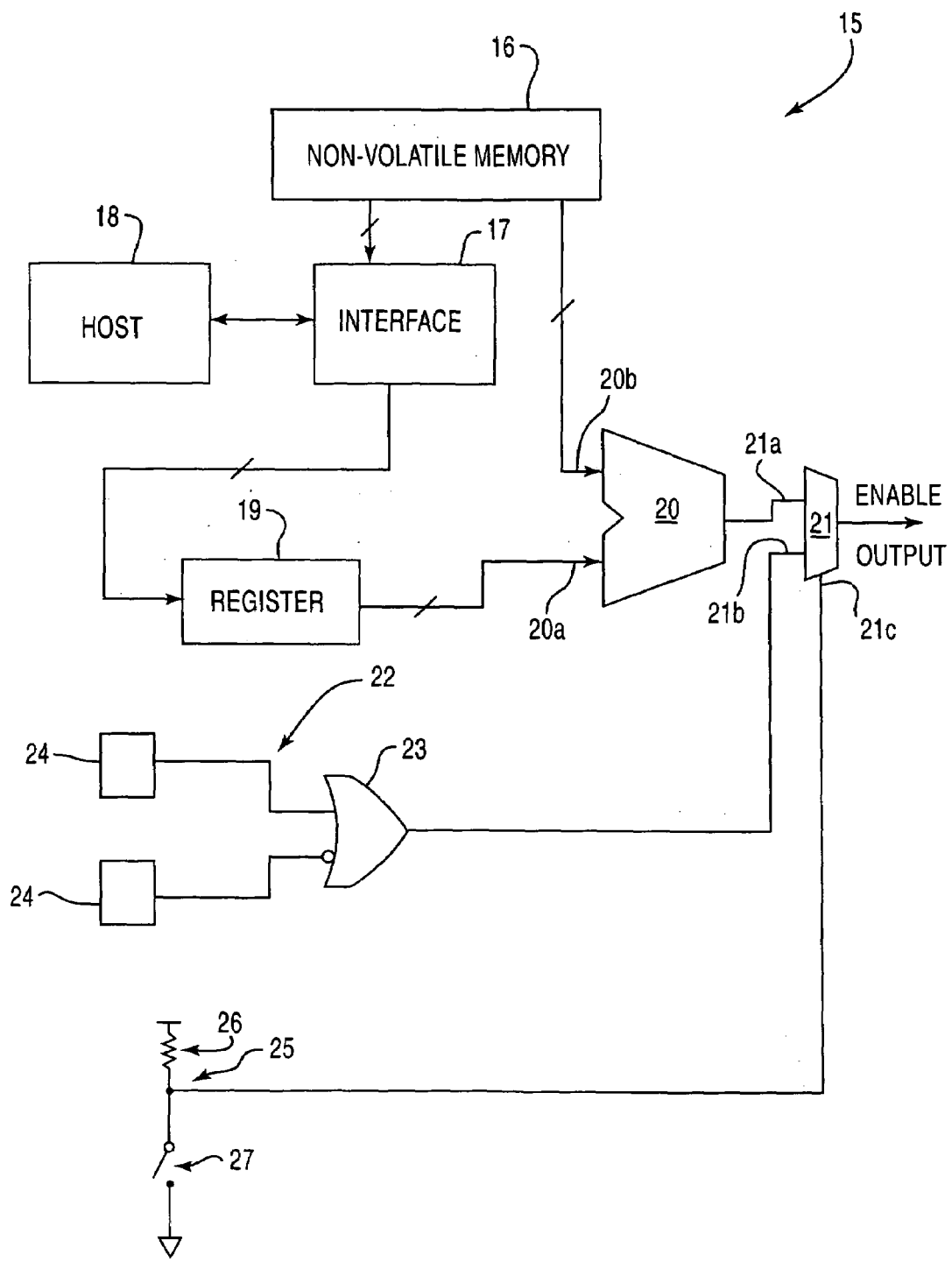
FIG. 1 illustrates an exemplary unique key function enabler according to the invention.

The present invention is directed to an apparatus and method for enabling functionality of an electronic component, wherein the enablement process is configured to be secure from attack by an unauthorized party. For purposes of explanation, the present invention will be described with respect to a computer component. However, it is understood that the present description with regard to a computer component is for explanatory purposes only, and therefore, is in no way limiting upon the present invention, as use of the present invention with various general electronic components is expressly contemplated within the scope of the present invention.

As an example of the present invention, a manufacturer of computer components manufactures a component, such as a network switch, for example. The network switch may be a single integrated circuit, or a plurality of components connected together. This component could include the basic capabilities to conduct packet switching, but also could have the ability to execute optional functions such as filtering, metering, head of line blocking, stacking, trunking, and/or load balancing, for example. However, not all customers are interested in purchasing a network switch with each of the above noted functions, as some customers may desire to purchase a network switch having only the ability to conduct network switching and filtering without the additional features. For this customer, the manufacturer is faced with two distinct options: first, design and manufacture a separate component capable of only switching and filtering, and then market and sell this component to this type or group of customers desiring only these particular features; or second, selling this customer the previously designed and manufactured component capable of conducting all of the above noted features, but only enable the features desired by the particular customer. In this situation, it is nearly always more economical for the manufacturer to sell the customer the component with the capability to conduct all of the functions with certain functions disabled, as designing and manufacturing a separate component with only the desired functions includes additional design and manufacturing costs which can be avoided by simply using a previously designed and manufactured component that is capable of at least the desired functions.

Therefore, in view of this situation, manufacturers regularly design components with the ability to selectively enable/disable various functionalities of the components, so that a single component can be sold to a wide range of customers having different component needs. If a customer desires additional functionality, an upgrade can be offered from the manufacturer simply by enabling the "dormant" functionality of the component. However, this flexibility in manufacturing inherently creates opportunity for unauthorized parties to purchase a component with various features disabled at a lower cost, and thereafter, attempt to enable the full functionality of the component without authorization from the manufacturer. Further still, this flexibility offers an unauthorized party the potential to determine a "passcode" for an entire product line or a manufacturer, and thereafter, market and sell upgrades for that product line without the manufacturers permission, thereby eliminating the manufacturer from the upgrade process for a multitude of customers.

A first embodiment of the present invention, shown in FIG. 1, is configured to minimize the possibility of an unauthorized user being able to "attack" the component and enable the optional functions of the component without true authorization from the manufacturer. FIG. 1 generally illustrates an exemplary configuration of a function enabler 15 of the present invention. The exemplary function enabler 15 is generally positioned on-board the computer or electronic component for which it is configured to enable various functions. Function enabler 15 includes a non-volatile memory 16, which may be in the form of a 96 bit unique unpredictable non-volatile register in the present exemplary configuration. Non-volatile memory 16 is generally characterized as a memory and/or register wherein the bits/information contained therein are programmed at the factory and are not visible to the user as a result of a physical limitation implemented at the factory. This type of physical limitation generally comprises manufacturing the register such that the contents therein are not readily accessible through the pins of the component or chip. In the present exemplary embodiment, non-volatile memory 16 can be programmed with, for example, a component identification number at the factory. Additionally, non-volatile memory 16 may be programmed with a unique key, which can be used to "unlock" or enable additional functions of the component, if the user inputs a key that corresponds to the unique key programmed at the factory. Non-volatile memory 16 is in communication with an interface 17 through, for example, a one way connection, and therefore, non-volatile memory 16 may send information to interface 17 but not receive information from interface 17 or be modified by input from interface 17. Interface 17 is also in communication with a host 18 through, for example, a bi-directional communication. An output of interface 17 is in communication with an input of a register 19, which is termed a "guess register" in the present exemplary embodiment. An output of guess register 19 is in communication with a first input 20a of a comparator 20. A second input 20b is in communication with non-volatile memory 16 through a one-way connection in the direction of comparator 20. The output of comparator 20 is in communication with a first input 21a of a multiplexer 21. Second input 21b of multiplexer 21 is in communication with a selection circuit 22. Selection circuit 22 includes an OR gate 23 having an inverted input, wherein OR gate 23 is in communication with additional non-volatile memory bits 24. A third input 21c of multiplexer 21 is in communication with a bonding option circuit 25, which includes an appropriately sized pull up resistor 26 and a switch 27.

In operation, for example, non-volatile memory 16 of function enabler 15 may be preprogrammed at the factory with both a unique component identification number and a unique key. Therefore, for example, assuming that the component is a network switch, the network switch unique identification number may be a 32 bit identification number or serial number of the network switch. Furthermore, assuming that non-volatile memory 16 constitutes a 96 bit non-volatile register, then the unique key associated with the network switch could be a 64 bit field stored in the register, which is generally generated through a random number-type process. However, although a 96 bit non-volatile register having a 32 bit identification number and a 64 bit unique key therein are presented as the present example, various other register sizes, as well as key and identification lengths, are contemplated within the scope of the present invention. When the user of the network switch desires to enable additional functions of the network switch, the user first must contact the manufacturer, or other party having access/ability to determine an appropriate passcode, to obtain an appropriate key or password to enable the desired functions of the network switch. Although the manufacturer is discussed as the party transmitting the passcode to the component, the present invention contemplates that various other parties are easily substituted for the manufacturer. The function of contacting the manufacturer is generally accomplished through host 18, which determines the identification number associated with the component/network switch through communication with non-volatile memory 16 via interface 17. This identification number corresponding to the particular component is then sent to the manufacturer by host 18, for example, with an accompanying request for a password or key corresponding to the requested additional functionality of the network switch. Generally, the transmission of the request for a password or key also may include an agreement between the user and the manufacturer for the user to compensate the manufacturer for the additional functionality to be enabled in the network switch. This compensation arrangement may include a transaction that occurs before the functionality is enabled, or alternatively, a transaction that takes place at the time the password/key is transmitted to the customer. The manufacturer receives the request information and determines the appropriate manufacturers key for the particular component and sends this key back to host 18. This entire process of communicating with the manufacturer in order to obtain a key may be undertaken, for example, through an internet connection, a direct dial data connection, or through a voice telephone call, as well as other known communication techniques. Host 18, upon receiving the key from the manufacturer, then sends the manufacturers key to interface 17, which transmits the manufacturer's key to register 19. Register 19 communicates the manufacturers key to the first input 20a of comparator 20. Additionally, non-volatile memory 16 transmits the unique key that was initially stored in non-volatile memory 16 during manufacture of the network switch to the second input 20b of comparator 20. Comparator 20, or other suitable device for comparing numbers, then compares the manufacturers key received from the guess register 19 to the unique key stored in non-volatile memory 16 to determine if the respective keys match. If the keys match, comparator 20 sends an enable signal to multiplexer 21 through a first input 21a to multiplexer 21. A second input 21b of multiplexer 21 receives an input from selection circuit 22. Selection circuit 22 determines whether multiplexer 21 uses the input from comparator 20 or bonding option circuit 25. For example, if the non-volatile memory 16 is programmed, then the additional non-volatile bits 24 may be programmed to a logical "1" and "0" respectively such that the enable signal generated by comparator 20 is selected. Alternatively, for example, both additional non-volatile bits 24 may programmed to either logical "1" or "0" such that the enable signal is selected from the bonding option circuit 25. Therefore, the bonding option in conjunction with the selection circuit offers a manufacturer the flexibility to selectively enable functionality of the network switch subsequent to the design phase of manufacturing. Additionally, the present invention contemplates that in order to detect any errors that may have occurred in the process of enablement of a function, host 18 may be used to determine whether the process was success. In particular, host 18 may initiate a testing of the enabled functionality to determine if the enablement process was successful, or alternatively, the output of comparator 20 or multiplexer 21 may be observed by host 18 in order to determine if the function enable signal was properly generated.

This configuration may be implemented on a component and tied to multiple functions, or alternatively, tied to individual functions of the component. Therefore, a single enabler circuit may enable a single function or multiple functions, and conversely, multiple enabler circuits may be used to individually enable a plurality of functions. Therefore, function enabler 15 provides the flexibility for manufacturers to selectively enable a single function of a component through a secure key, or alternatively, multiple functions at a time. However, in order to effectively implement this configuration, the manufacturer is generally required to closely monitor the design and manufacturing phases of the respective components. More particularly, the manufacturer must generally record each unique manufacturers key programmed into non-volatile memory 16 on every component, so that when individual users contact the manufacturer for permission to enable additional functionality of components in the users system, then the manufacturer can readily provide the correct password or key to be transmitted to guess register 19. As an alternative to storing every key of every component at the manufacturer, it is also contemplated that the manufacturer may simply store an algorithm configured to generate the unique key stored in non-volatile memory 16 during the manufacturing stage. Therefore, in this situation, when the manufacturer receives a request from a host for a manufacturers key, the manufacturer can simply determine an appropriate algorithm to use from the identification number of the component, calculate the key using the appropriate algorithm, and transmit the key to the user for implementation. This configuration is desirable, as the memory space required to store each and every key implemented in the manufacturing phase can be substantial, and is avoided by the algorithm approach. In addition to monitoring the manufacturing process, the manufacturer must also carefully select the key length. If a sufficiently long key length is not selected, then an attacker may simply be able to try all possible key combinations in order to enable the functionality of the component. This type of attack is referred to as a brute force attack, and will be discussed herein. However, an overly long key is not desirable, as the computation time necessary to process an overly long key may render the system inefficient. Additionally, overly long keys increase the necessary on-chip overhead, and therefore, increase the manufacturing cost. Therefore, key length selection is important to effective operation of the present invention. In selecting an appropriate key length, manufacturers may consider the available processing power of computers and components, as well as anticipated computing power in the lifetime of the component, as an attacker will almost always employ a computer to launch a brute force attack.

Figure 2:
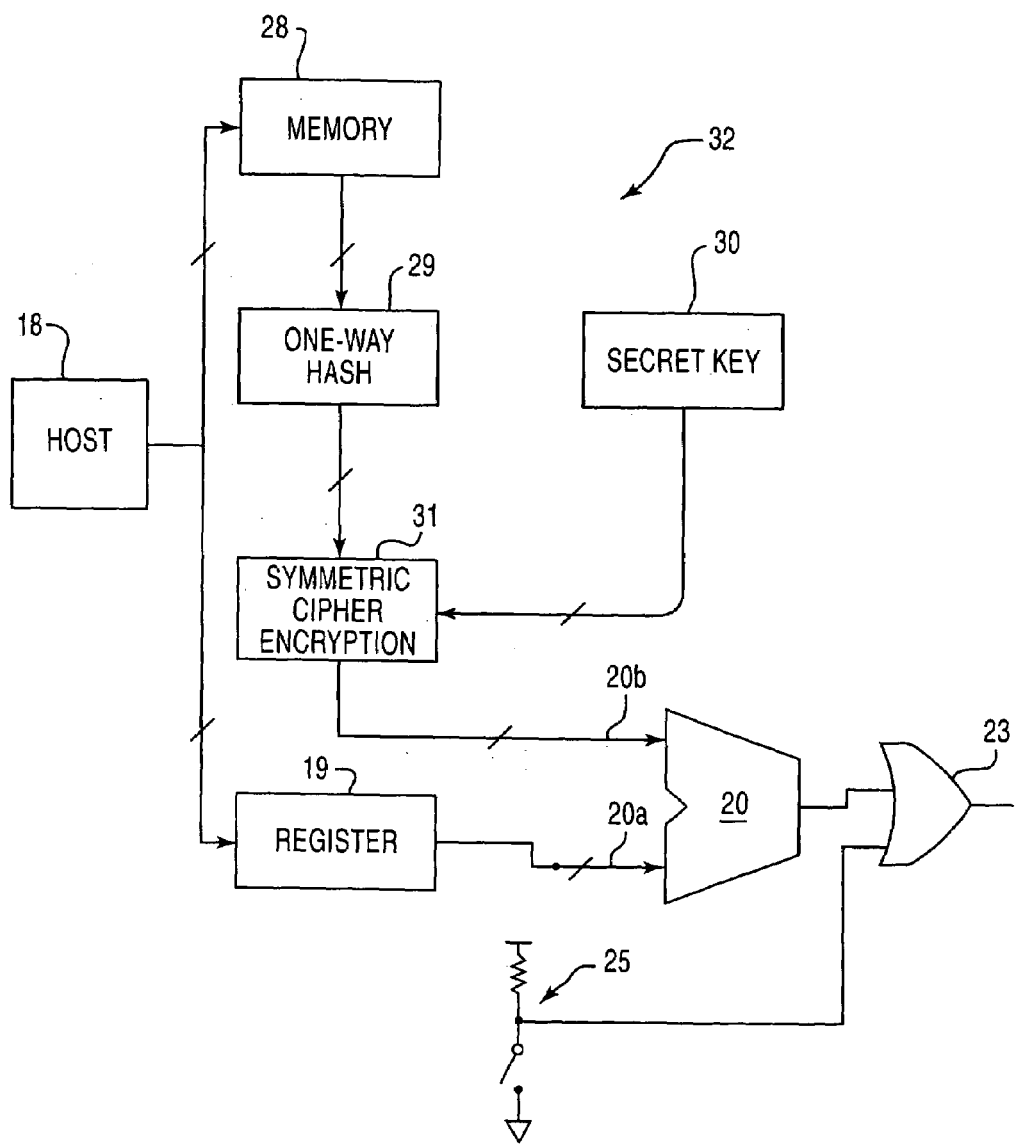
FIG. 2 illustrates an exemplary secret key function enabler according to the invention.

In another embodiment of the present invention, as shown in FIG. 2, the necessity to utilize non-volatile memory for enabling functionality of a component is removed. As such, the requirement of the previous embodiment to pre-program each and every component at the manufacturing stage with the unique key used to enable additional functions of the component is eliminated. The embodiment shown in FIG. 2 relies upon the assumption that every component manufactured is associated with a unique identification and/or property that is not common to any other component. For example, a media access controller (MAC) is generally programmed at the manufacturing level, or alternatively, by the user, with a 48 bit address that is unique to the particular MAC. This unique identification number would be used in the embodiment of FIG. 2 to avoid the problem associated with a person attacking a single component and discovering the passcode for that single component and using this passcode to enable every other component in the particular series of components, as the passcode of the embodiment of FIG. 2 is dependent not only upon a secret key stored on-board the component, but also the identification number. This process is generally referred to as symmetric cipher encryption, and is also called secret key encryption.

Although secret key encryption such as that which is illustrated in FIG. 2 has certain advantages over the embodiment of FIG. 1, the security of secret key/symmetric cryptosystems is dependent upon two things: first, the relative strength of the encryption algorithm employed; and second, the bit length of the key used. Therefore, assuming that a relatively strong algorithm is employed in a secret key system, the vulnerability of the system is again a function of the key length, as the most efficient method of breaking the system would likely be through a brute force attack on the system. In order for an attacker to put forth such an attack, only a small portion of ciphertext along with the corresponding plaintext is needed to begin. Thereafter, the attacker simply attempts every possible passcode combination until the correct passcode is found. This process is generally accomplished through the use of a computer programmed to try every possible passcode. As such, the time needed to determine a passcode is clearly dependent upon both the computing speed of the attackers computer as well as the length of the key, which plainly determines the number of possible combinations. Therefore, if the key selected for the system were an 8 bit key, then there would be only 256 possible passcode combinations, which a standard computer could guess in a fraction of a second. However, as the key length increases, the number of combinations obviously increases, which plainly serves to decrease the possibility of "guessing" the passcode through a brute force attack. Although no passcode is guaranteed to be secure, as any length passcode can eventually be guessed with enough time, if a key is sufficiently long, it is unfeasible to attempt to guess the passcode through a brute force approach. For example, if a 56 bit key is employed, then there are $2^{56}$ possible passcode combinations. With this many possible keys, a computer attempting 1 million keys a second would likely take 2,285 years to find the correct key. If the key were increased to 64 bits long, then the same computer would take about 585,000 years to guess the passcode. Therefore, again, assuming a relatively strong algorithm, if the key is chosen to be sufficiently long in view of the available computing power, then the secret key system will likely be successful, as a brute force attack would be unfeasible in view of the required time to guess the key. Further, not only must the key length be chosen to be sufficiently long to deter a brute force attack, but the key must also be selected to be sufficiently short such that the computation time involved with using the key is not overwhelming. Therefore, again, the selection of the key length should be based primarily upon the available computing power, both presently and in the expected lifetime of the key.

FIG. 2 illustrates an exemplary implementation of symmetric cipher encryption using a secret key and a identification number in the present invention. In this embodiment, a secret key function enabler 32 includes memory 28, which is not required to be non-volatile memory as used in the previous embodiment. Memory 28 is again used to store a component identification number, as discussed above, which may be selected by the user, however, memory 28 does not store a key of any sort in the present exemplary embodiment. The identification number, which, for example, can be a 32 bit number, is transmitted from memory 28 to a hash function module 29. Hash function module 29 is configured to receive the input from memory 28, which is termed a pre-image input, which in the embodiment of FIG. 2, represents the component's identification number, and output a hash value. In the present exemplary embodiment hash function module 29 is shown as a one-way hash function module, which is also known generally as a cryptographic compression function, cryptographic contraction function, a cryptographic message digest, and/or a cryptographic checksum.

A one-way hash function is designed to compute a hash value from pre-image inputs. However, the strength of a one-way hash function is that it is easy to compute a hash value from pre-image inputs, but extremely difficult to compute the pre-image inputs that will computationally hash to a particular hash value. Additionally, a one-way hash function is generally collision free, which indicates that it is difficult to generate different pre-image inputs that will hash to the same hash value. Further, a one-way hash function is generally public, and therefore, there is generally very little secrecy to the process. As such, the security of a one-way hash function lies within the "one-way" function characteristics of the hash function and not the availability of the hash function. More particularly, the output of a one-way hash function not dependent upon the input in any discernable way, and therefore, if a single bit in the pre-image changes, then, on average, half of the hash value bits are expected to change. Therefore, even if an attacker is given a hash value, it is computationally unlikely that the attacker will be able to determine the pre-image inputs to a one-way hash function that generate the hash value within a reasonable time period.

However, in the present exemplary embodiment, hash function module 29 is an optional feature of the invention, as this module can be removed from the embodiment without substantially degrading the operational characteristics of the invention. Nonetheless, hash function module 29 is implemented in the present exemplary embodiment in order to increase the functional security of the system, as well as allowing the option of reducing the sheer size of the pre-image input. This is a practical decision, however, as pre-image inputs are often lengthy, and therefore, it is often desirable to reduce the bit size of the inputs for encryption. Although a 128 bit field, for example, is generally not unusually long for many encryption applications, it may be computationally burdensome for smaller/less powerful applications, and therefore, hash function module 29 may be utilized to reduce the length of the bit stream in order to save computation time and resources. Further, with regard to the increased functional security of the system, the use of the hash function within the embodiment of FIG. 2 additionally operates to deter an attacker from compromising the system using the known "chosen cipher text" attack.

Generally, an example of the chosen cipher text attack is when an attacker of the component sends dummy cipher text to the manufacturer under the guise of a genuine customer attempting to upgrade a component. The manufacturer, assuming that it is not discovered that the attacker is posing as a genuine customer, decrypts the cipher text and returns the corresponding clear text. Although the returned clear text does not readily reveal the decryption key, attackers may select the dummy cipher text cleverly so that the returned clear text reveals substantial information about the undiscovered key, which may lead the attacker ultimately to discover the key through alternative computational means. However, through the implementation of the one way hash function into the present invention the chosen cipher text attack becomes difficult to successfully accomplish, as the attacker must also determine the input to the hash function that generates the cipher text, which is an inherently difficult task in and of itself.

Returning to the exemplary embodiment shown in FIG. 2, the hash value generated by hash function module 29 is transmitted to a symmetric cipher encryption module 31 as an input. Another input to a symmetric cipher encryption module 31 is a secret key, which is transmitted to a symmetric cipher encryption module 31 from secret module 30. The hash value input to the symmetric cipher encryption module 31 is termed the clear text. The encrypted output of the symmetric cipher encryption module 31 is termed the cipher text. The cipher text generated at the output of the symmetric cipher encryption module 31 is transmitted to the second input 20b of comparator 20. The first input 20a of comparator 20 is in communication with guess register 19, which is supplied with the guess passcode for enabling the desired functionality of the component by host 18. Therefore, the cipher text generated by symmetric cipher encryption module 31 is compared to the guess passcode inserted into guess register 19 by host 18. If comparator 20 determines that the cipher text from symmetric cipher encryption module 31 matches the guess passcode, then an enable signal is sent from the output of comparator 20 to OR gate 23. Or gate 23 conducts a logical "OR" operation with inputs from comparator 20 and bonding option 25, which was discussed with regard to the previous embodiment. Therefore, if either one of secret key function enabler 32 or bonding option 25 indicates that the functionality is to be enabled, then an enable signal is transmitted from the output of OR gate 23, which is used to initiate the enabling of the desired functionality.

An example of the operation of secret key function enabler is illustrated by the MAC mentioned above. In particular, a MAC is generally programmed with a unique identification number, which is often the address of the MAC itself. Therefore, the unique identification number stored in memory 28 of the present embodiment can be, for example, a 48 bit MAC address. This 48 bit address may be transmitted as pre-image information to a one-way hash function module 29, for example. The unique identification number is processed by a one-way hash function to generate a hash value of a predetermined length at the output of hash function module 29. This output is then combined with an additional pre-image information in the form of a secret key received from secret key module 30, and received as an input to symmetric cipher encryption module 31. The secret key, which is generally programmed into the component or MAC at the factory and generally hardcoated, can be, for example, 64 bits long, or another length as required by the user. These inputs are processed by symmetric cipher encryption module 31 and encrypted to generate cipher text at the output of the symmetric cipher encryption module 31. This cipher text can be transmitted to a second input of comparator 20 for comparison with a "guess passcode" supplied to guess register 19 by the user. The process of supplying the guess passcode to guess register 19 generally involves the user contacting the manufacturer or other party having control over passcodes, often through host 18, to obtain a valid passcode to enter into guess register 19. As noted above with respect to the previously discussed embodiment, this process of contacting the manufacturer may be undertaken via the internet, direct dial communications link, or other communications methods. If the guess passcode matches the cipher text supplied to comparator 20, then an enable signal is generated at the output of comparator 20. This enable signal is transmitted to an input of OR gate 23, where a logical "or" operation is conducted with the output of symmetric cipher encryption module 31 and bonding option circuit 25. Therefore, if either of symmetric cipher encryption module 31 or bonding option circuit 25 yield an enable signal, then the corresponding functionality of the MAC is enabled, as a logical "1", which may correspond to an enable signal, will be generated at the output of the OR gate 23.

Figure 3:
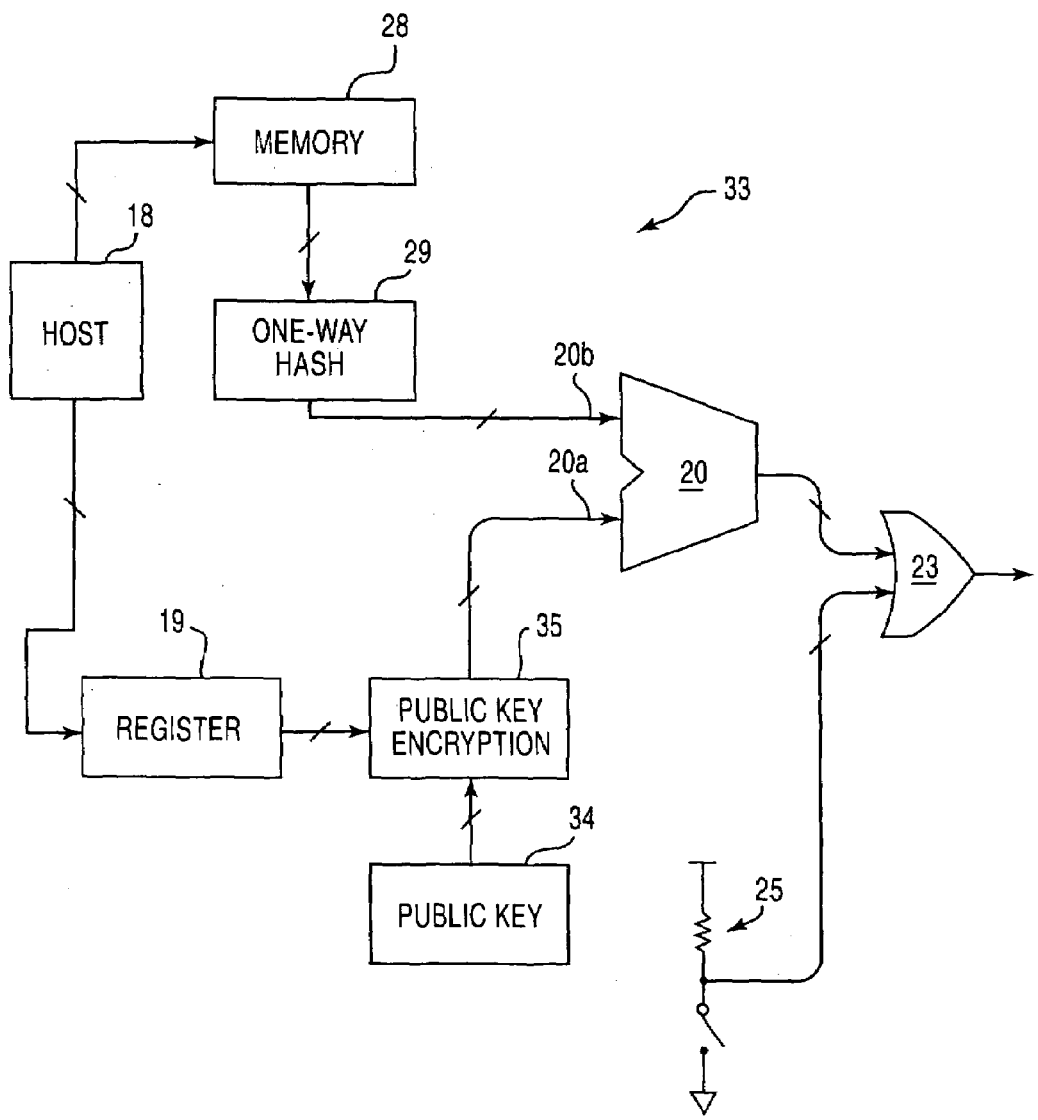
FIG. 3 illustrates an exemplary public key encryption enabler according to the invention.

Since a symmetric cipher encryption process is reversible by definition, an embodiment representing the reverse encryption process is shown in FIG. 3. In this figure, encryption is conducted on the output of register 19 and not hash function module 29. Further a public key encryption configuration is used. Public key configurations generally rely on one key for encryption, and a different, but related key for decryption. This implementation renders it generally computationally unfeasible to determine the decryption key given only knowledge of the cryptographic algorithm and the encryption key. Further, current public key encryption configurations are capable of using either of the two related encryption keys for the encryption and decryption processes. As such, it is not necessary to undertake the expense associated with protecting the confidentiality of one of the keys. Therefore, the manufacturer can, for example, keep one of the keys secure within the manufacturing facility, while the second key may be stored on board a component in a physical location that, for example, may be accessible to an attacker without substantial effort. Although an attacker may be able to extract the on-board key from the component, it will be essentially useless for purposes of enabling the functionality of a component without being able to determine the corresponding secret key held by the manufacturer. This configuration provides an advantage over the previous embodiments, as the manufacturer has complete control over the security of the key held within the manufacturing facility, and therefore, need not worry about preventing an attacker from being able to extract an on board key from a component. This reduces design phase problems and decreases manufacturing costs, as the additional design and manufacturing costs associated with protecting an on board key are eliminated.

Returning to the exemplary embodiment shown in FIG. 3, host 18 is again in communication with memory 28, which contains an identification number that may correspond to the component to be enabled by public key encryption device 33. Memory 28 communicates the component identification number to hash function module 29 as a pre-image input. Hash function module 29, which is a necessary component in public key system 31, unlike secret key function enabler 32, processes the pre-image input and generates a hash value at an output of hash function module 29. FIG. 3 illustrates hash function module 29 as a module for executing a one way hash function, as this type of function offers greater security against attackers. The hash value generated by hash function module 29 is transmitted to the second input 20b of comparator 20. Further, host 18 also obtains a guess passcode that is transmitted to guess register 19. This guess passcode, as noted in the previous embodiments, is generally obtained from the manufacturer. The passcode is then transmitted as clear text to public key encryption module 35. Additionally, public key module 34, which contains the previously discussed public key for the device therein, transmits a public key to public key encryption module 35. As such, public key encryption module receives both the guess passcode and the public key as clear text inputs. These two inputs are processed/encrypted by public key encryption module 35 to generate cipher text at the output of public key encryption module 35. This cipher text is transmitted to the first input 20a of comparator 20. Comparator 20 then compares the cipher text received from public key encryption module 35 representing the guess passcode to the hash value generated by hash function module 29 representing the identification number of the component. If comparator 20 determines that these two values match, then an enable signal is output from comparator 20 indicating that public key encryption device 33 has determined that the guess passcode is authentic and that the corresponding functionality of the component should be enabled. The output of comparator 20, in similar fashion to the previously discussed embodiment, is transmitted to an input of OR gate 23, while another input of OR gate 23 is connected to the output of a bonding option circuit 25. Therefore, the manufacturer has the option of enabling the functionality of the component even if the public key or other information relevant to the enabling process was not programmed into the component at the manufacturing or design stages of the component.

Figure 4:
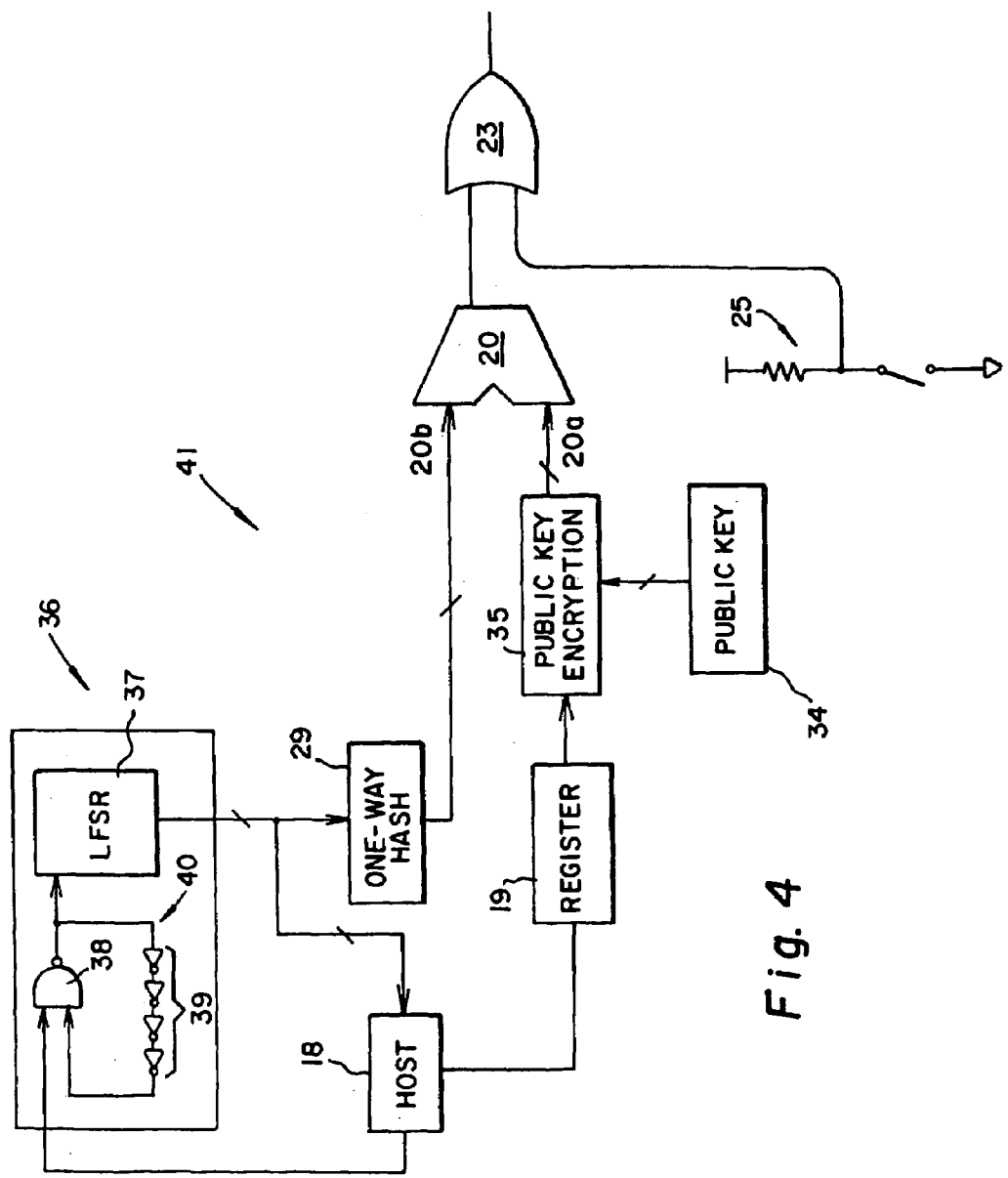
FIG. 4 illustrates an exemplary public key enabler with a random number generator according to the invention.

In another exemplary embodiment of the present invention, shown in FIG. 4, the identification number discussed in the previous embodiments is eliminated from the configuration. In place of the identification number and the device for storing such in the previous embodiments, the embodiment of FIG. 4 utilizes a random sequence generator 36, which is configured to generate a random sequence of bits of a predetermined length. These randomly generated bits essentially correspond to the identification number used in the previous embodiments, however, since the random bits are generated on board, the need to program these bits into the component at the design and/or manufacturing stage is eliminated for the manufacturer. Further, since these bits are not programmed into the chip, another factor in the encryption process is unavailable for an attacker to utilize in an attack on the component.

Aside from the lack of the identification number being stored on board the component, the embodiment of FIG. 4 is essentially identical to the previously discussed public key encryption device 33. Therefore, in view of the discussion of the components of the public key encryption device 33, the discussion of the embodiment of FIG. 4 will focus upon the random sequence generator 36. Furthermore, the substitution of a secret key scheme of FIG. 2 in place of the shown public key scheme is anticipated within the scope of the present invention. Although various configurations and devices are known as acceptable random number generators for cryptographic purposes, the embodiment of FIG. 4 illustrates the use of a linear feedback shift register (LFSR) 37 in conjunction with a ring oscillator configuration 40 in order to generate the desired random number. However, it would be understood by those skilled in the art that various alternative apparatuses and devices for generating the desired random number could be employed in place of the a linear feedback shift register 37 and the ring oscillator configuration 40 without departing from the scope of the present invention. Generally, the exemplary random sequence generator 36 is configured to receive a run signal at an input to the generator. This input indicates that the generator is to output a random number for use by the random id based enabler 41. After receiving a run signal and generating the desired random number, the random number is transmitted to the input of hash function module 29 as pre-image information. Additionally, the random number is communicated to host 18. More particularly, the run signal received by random sequence generator 36 is received at a first input of NAND gate 38. The output of NAND gate 38 is transmitted to an input of linear feedback shift register (LFSR) 37, as well as to the input of a series bank of inverters 39. The output of the series bank of inverters 39 is in communication with a second input of NAND gate 38. As a result of the exemplary configuration shown in FIG. 4, upon receiving a run signal at the input to random sequence generator 36, the cooperative operation of ring oscillator 40 and LFSR 37 generate a random number at the output of random sequence generator 36.

In operation, random id based enabler 41 first receives a run signal at the input to the random sequence generator 36, which operates to initiate the generation of the desired random identification number. Once this random number is generated, it is transmitted to both hash function module 29 and host 18. Hash function module 29, which is once again shown as a one way hash function for exemplary purposes, receives the random number as pre-image input and generates a hash value at the output of hash function module 29. This hash value is communicated to a second input 20b of comparator 20. Additionally, host 18, upon receiving the random number from to random sequence generator 36, contacts the manufacturer to obtain a guess passcode corresponding to the random number generated by random sequence generator 36. The manufacturer, having the private key corresponding to the public key of random id based enabler 41, generates a guess passcode corresponding to the public key of random id based enabler 41 from the private key and an encryption/decryption algorithm. The guess passcode generated by the manufacturer is then transmitted to host 18. Upon receiving the guess passcode from the manufacturer corresponding to the to random number generated by the random sequence generator 36, host 18 transmits the guess passcode to guess register 19. Guess register 19 transmits the guess passcode to public key encryption module 35 as clear text, where the guess passcode is then encrypted with the public key stored in public key module 34 to generate cipher text at the output of public key encryption module 35. This cipher text, which, if the key obtained from host 18 is authentic, is calculated to match the hash value output from hash function module 29, is then transmitted to the first input 20a of comparator 20. Comparator 20 compares the calculated cipher text to the hash value generated by hash function module 29. If the cipher text matches the hash value, an enable signal is transmitted from the output of comparator 20 to an input of OR gate 23. Another input of OR gate 23 is again connected to a bonding option circuit 25 to generate a manual override of random id based enabler 41 if required. Upon processing the inputs from comparator 20 and bonding option circuit 25, assuming that at least one of these inputs is a logical high signal, OR gate 23 outputs an enable functionality signal that is used to initialize enablement of the corresponding functionality.

Upon consideration of the random id based enabler 41 of the embodiment of FIG. 4, it is apparent that the need for programming/designing a unique component identification into every component is removed by the embodiment of FIG. 4. However, in the configuration shown in FIG. 4, the component would likely require re-enablement upon every startup of the component, as every startup would generate a new random number from random sequence generator 36 that would not correspond to the previously acquired guess passcode. Therefore, although the embodiment of FIG. 4 may require additional processing steps upon initialization in order to fully enable the component, these additional processing steps strengthen the security provided by the present exemplary embodiment, as a brute force attacker would be required to re-attack the component in order to re-enable the functionality.

Although the present invention has been described based upon the above noted embodiments, it would be apparent to those of skilled in the art that certain modifications, variations, and/or alternative constructions or configurations would be available, while remaining within the spirit and scope of the invention. In particular, although specific components and algorithms are mentioned above with regard to the exemplary embodiments, it is contemplated within the scope of the present invention that the function enabler of the present invention may be applicable to various electronic components in various configurations. Further, various cryptographic algorithms may be used in the present invention without departing from the true scope of the present invention. Therefore, in order to determine the true scope of the present invention, reference should be made to the following claims.

The invention claimed is:

1. An apparatus for enabling functionality of a component, said apparatus comprising:
   an identification module, said identification module having an identification number stored therein;
   a hash function module in communication with said identification module;
   a host in communication with said identification module, said host being configured to communicate with a manufacturer to request a guess passcode corresponding to the identification number stored in said identification module;
   a guess register in communication with said host;
   an encryption module in communication with said guess register;
   a public key module in communication with said encryption module, said public key module having a public key stored therein;
   a comparator in communication with said encryption module and said hash function module, wherein said comparator compares a first bit string to a second bit string to generate a function enable output for the component, and wherein said first bit string comprises a ciphertext bit string generated by the encryption module and said second bit string comprises a hash value generated by said hash function module; and
   a selecting device for selecting at least one of the function enable output and a bonding option output, said selecting device comprising an OR gate having at least one input for receiving said function enable output and the bonding option output.

2. An apparatus for enabling functionality of a component as recited in claim 1, wherein said identification module further comprises an onboard non-volatile register.

3. An apparatus for enabling functionality of a component as recited in claim 1, wherein said hash function module further comprises a one-way hash function module configured to receive a pre-image input and output a hash value using a one-way hash function algorithm.

4. An apparatus for enabling functionality of a component as recited in claim 1, wherein said encryption module further comprises a public key encryption module, said public key encryption module being configured to receive the public key and the guess passcode as inputs and generate a ciphertext bit string as an output.

5. An apparatus for enabling functionality of a component as recited in claim 1, said apparatus further comprising:
   a bonding option circuit, said bonding option circuit comprising
   a pull up resistor in communication with said OR gate and a power supply; and
   a switch in communication with a ground potential and said OR gate.

6. An apparatus for enabling functionality of a component as recited in claim 1, wherein said selecting device further comprises:
   a multiplexer having at least one multiplexer input in communication with the comparator and a multiplexer output;
   a selection circuit in communication with the at least one multiplexer input;
   a bonding option circuit in communication with the at least one multiplexer input,
   wherein said multiplexer is configured to receive a selection input from the selection circuit that is used to determine whether to enable functionality of said component in accordance with the bonding option output or the function enable output.

7. An apparatus for enabling functionality of a component as recited in claim 1, wherein said selecting device further comprises:
   at least one first non-volatile memory location having at least one first selection bit stored therein;
   at least one second non-volatile memory location having at least one second selection bit stored therein; and
   an OR gate having a first input, a second inverted input, and a logic output, said first input being in communication with said at least one first non-volatile memory location and said second inverted input being in communication with said at least one second non-volatile memory location,
wherein said selection circuit is configured to generate a selection indicator on the logic output of the OR gate in accordance with the at least one first selection bit and said at least one second selection bit.

8. An apparatus for enabling functionality of a component as recited in claim 1, wherein said component further comprises at least one of a network switch and a media access controller.

9. A component for selectively enabling functionality of an electronic device, said component comprising:
 means for generating an encrypted bit string, wherein said means for generating an encrypted bit string comprises
  a public key encryption module,
  a public key module in communication with said public key encryption module, said public key module having a public key stored therein, and
  a guess register in communication with said public key encryption module,
  wherein said public key encryption module receives a guess passcode from the guess register and the public key from the public key module in order to generate a ciphertext bit string;
 means for acquiring the guess passcode, said means for acquiring a guess passcode comprising a host in communication with said means for generating an encrypted bit string;
 a hash function module in communication with an on board memory, said on board memory having a predefined identification number stored therein, wherein said hash function module receives an identification number from said on board memory and generates a corresponding hash value therefrom;
 means for determining if the ciphertext bit string matches the hash value; and
 means for outputting a functionality enable signal when the means for determining determines that the ciphertext bit string matches the hash value.

10. A component for selectively enabling functionality of an electronic device as recited in claim 9, wherein said means for acquiring a guess passcode comprises:
 an identification module in communication with said host, wherein said host is configured to communicate with a manufacturer of the component to request the guess passcode corresponding to an identification number stored in said identification module.

11. A component for selectively enabling functionality of an electronic device as recited in claim 9, wherein said hash function module further comprises:
 an on board memory, said on board memory having an identification number stored therein; and
 a one-way hash function module in communication with said on board memory.

12. A component for selectively enabling functionality of an electronic device as recited in claim 9, wherein said means for determining further comprises a comparator.

13. A component for selectively enabling functionality of an electronic device as recited in claim 9, wherein said electronic device further comprises at least one of a network switch and a media access controller.

14. A method for enabling functionality of an electronic component, said method comprising the steps of:
 encrypting a first bit string and a second bit string to generate a third bit string;
 calculating a fourth bit string;
 comparing the fourth bit string to the third bit string;
 generating a function enable signal in accordance with the comparison; and
 selecting at least one of a bonding option output and the function enable signal as a final enable output;
 wherein said encrypting step further comprises the step of determining a guess passcode, and wherein said step of determining a guess passcode comprises the step of requesting the guess passcode from a manufacturer, and
 wherein said comparing step further comprises
  receiving the fourth bit string representing a hash value and the third bit string representing a cipher text bit string in at least one input of a comparator; and
  determining if the fourth bit string matches the third bit string.

15. A method for enabling functionality of an electronic component as recited in claim 14, wherein said encrypting step further comprises the steps of:
 receiving a public key in an encryption module;
 receiving the guess passcode in the encryption module; and
 encrypting the public key and the guess passcode to generate a ciphertext bit string.

16. A method for enabling functionality of an electronic component as recited in claim 14, wherein said calculating step further comprises:
 receiving an identification number in a hash function module; and
 generating a hash value corresponding to the identification number.

17. A method for enabling functionality of an electronic component as recited in claim 14, wherein said determining step comprises the steps of:
 calculating the guess passcode in accordance with a predetermined algorithm; and
 transmitting the guess passcode to an on board host.

18. A method for enabling functionality of an electronic component as recited in claim 14, wherein said requesting step further comprises the steps of contacting a manufacturer through at least one of an internet connection, a telephone voice call, and a direct dial connection.

19. A method for enabling functionality of an electronic component as recited in claim 14, wherein said electronic component further comprises at least one of a network switch and a media access controller.

* * * * *